May 8, 1934.   P. R. ORD   1,957,904
PHOTOGRAPHIC FILM GATE
Filed March 24, 1931
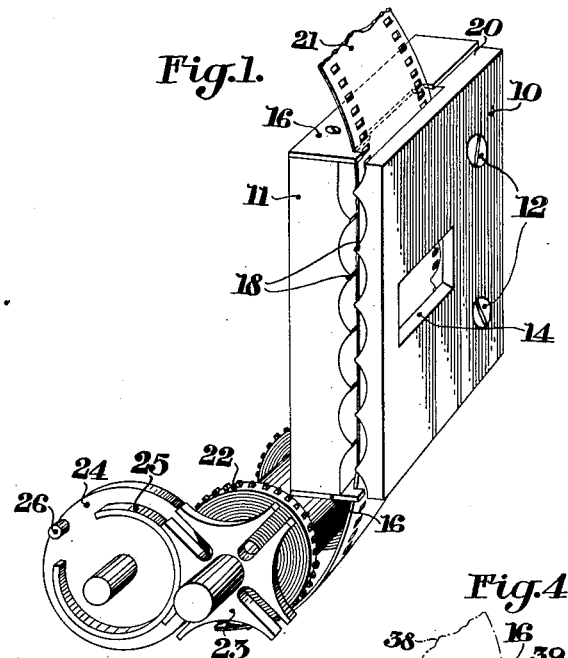
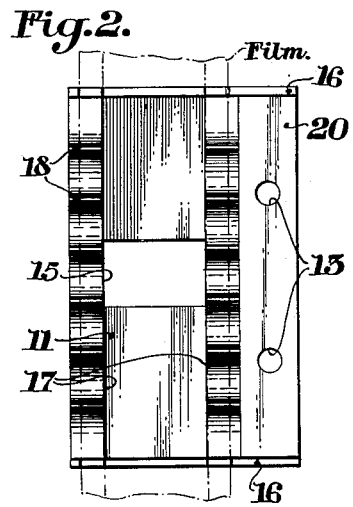
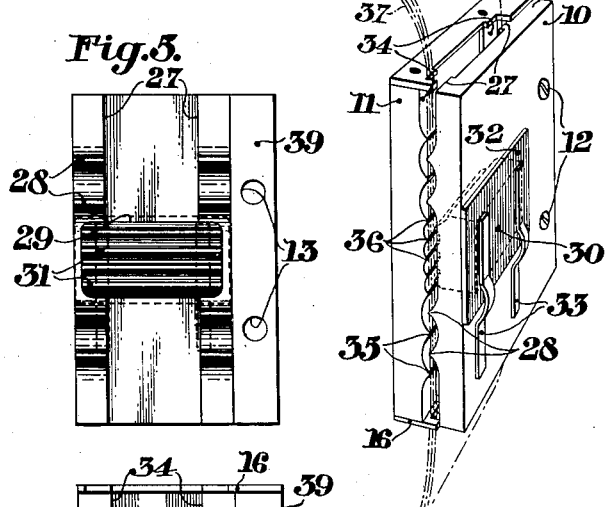
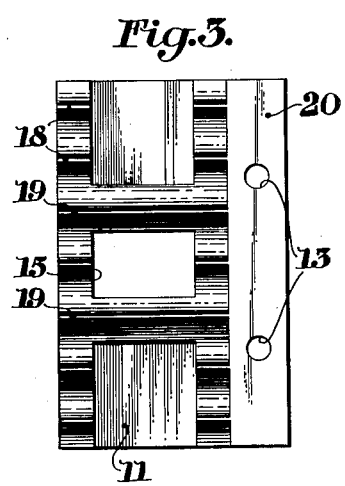
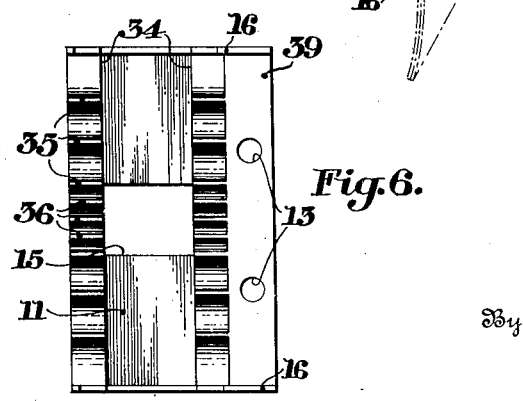
Inventor
Percy R. Ord Patented May 8, 1934

1,957,904

UNITED STATES PATENT OFFICE 1,957,904

PHOTOGRAPHIC FILM GATE

Percy R. Ord, Rochester, N. Y., assignor to Eastman Kodak Company, Rochester, N. Y., a corporation of New York Application March 24, 1931, Serial No. 524,828

12 Claims. (Cl. 88—17)

The present invention relates to a photographic film gate, and more particularly to film gates especially adapted for use in motion picture apparatus.

Recent developments in the photographic and motion picture arts have created the necessity of providing a film gate of the least possible frictional resistance to film movement. The reduction of frictional resistance to the film movement through the gate becomes especially important in motion picture apparatus having ultra-rapid film speeds, such as for "slow motion" pictures.

Furthermore, the reduction of frictional resistance to film movement in film gates for cameras and projectors may be accomplished without sacrifice of a flat plane film surface. Whereas, for printers and similar apparatus the film surfaces may be slightly serpentine.

The primary object of the present invention is the provision of a photographic film gate which presents only slight frictional resistance to film movement.

Another object of the invention is the provision of a photographic film gate which contacts only at intervals with the surfaces of the film.

A further object of the invention is the provision of a photographic film gate with elements having runners with transverse ridges, said runners being fixedly spaced so that the plane of ridge summits for one runner is at a distance of at least one film thickness from the plane of the ridge summits on the opposite runner, or so that the plane of ridge summits for one runner is at a distance more than one and less than two film thicknesses from the plane of the ridge summits on the opposite runner.

Still another object of the invention is the provision of a photographic film gate with elements having ridges making contact with the film at more frequent intervals adjacent the gate apertures.

A still further object of the invention is the provision of a photographic film gate presenting only very small frictional resistance to film movement and withal maintaining the film surface in a flat plane, or in a slightly serpentine path through the gate.

Other objects of the invention will occur to those skilled in the photographic art as the description thereof proceeds.

The above-mentioned objects of the invention are embodied in a film gate having a pair of elements with undulating surfaces of varying spacing and disposition and which contact the film at intervals, said elements being fixedly spaced so that the film surface is maintained flat or only slightly serpentine.

Reference is hereby made to the accompanying drawing in which similar reference numerals designate similar elements and in which:

Fig. 1 is a perspective view of an assembled film gate according to the invention.

Fig. 2 is a front view of the back gate element illustrating the preferred formation of the runners and transverse ridges thereon.

Fig. 3 is a front view of the back gate element illustrating a modified formation of the runners and transverse ridges thereon.

Fig. 4 is a perspective view of an assembled film gate particularly adapted to a printer.

Fig. 5 is a rear view of one gate element of Fig. 4 illustrating the formation and position of the presser pad, and Fig. 6 is a front view of the other gate of Fig. 4 illustrating the formation of the transverse ridges and corrugations thereon.

In the illustrated embodiment of the invention the film gate is composed of a pair of elements, one gate element 10 being fixedly attached to the other gate element 11 by means of a pair of bolts 12 passing through gate element 10 and engaging tapped holes 13 in the other gate element 11. The gate elements 10 and 11 are provided with respective apertures 14 and 15 registering with each other to form the gate aperture.

The facing sides of each gate element have undulating surfaces such as runners which are recessed to form transverse ridges. The runners on each gate element are parallel and located so that the mean or average spacing between runners will be equal to the film width. Guide means such as recessed plates 16 are fastened to each end of one of the gate elements to maintain the film in proper alignment within the gate.

The transverse ridges on the runners may, or may not be, of equal frequency or amplitude, but must be such that a flat plane will make line contact with the summits or maximum portions of the ridges. Since the recessed portions between the transverse ridges are in staggered relation and may vary in depth or be of any desired depth, it is not accurate to define the spacing of the gate elements with respect to the distance between opposite tangible portions of the runners. Therefore the spacing of the gate elements or ridges has been defined in the specification and claims in terms of the distance or spacing between the flat planes which would pass through the summits or maximum portions of the ridges.

In the preferred embodiment of the invention both of the gate elements 10 and 11 have integral runners 17 on each side of the gate aperture which have a mean spacing equal to the film width and which are recessed at intervals to form transverse ridges 18.

In this embodiment, the spacing or frequency of the transverse ridges 18 is equal throughout the runners 17, but the occurrence of the ridges 18 on one gate element is such with respect to their occurrence on the other gate element that the summits or maximum portions of the ridges 18 on one gate element are opposite to the midpoint between ridges 18 on the other gate element. This relative position of ridges 18 will hereinafter and in the claims be designated as a staggered relation between the transverse ridges or summits thereof.

If extreme accuracy in the planeness of the film at the gate aperture is required, then one or more of the transverse ridges adjacent the gate aperture on each element may be extended from one runner to the other, such as transverse ridges 19 in Fig. 3.

In either of the forms illustrated in Figs. 1, 2, and 3, the flat plane passing through the summit of the transverse ridges 18 and 19 on one gate element is spaced at a distance of one film thickness from the flat plane passing through the summits of transverse ridges 18 or 19 on the other gate element. This particular spacing of the gate element is accomplished by the provision of accurately machined spacers 20 which are integral with gate elements 10 and 11 along one edge of each. Spacers 20 may each exceed the height of the transverse ridges 18 and 19 by a distance equal to one-half of the film thickness or be of any height such that the combined extension between the summits of transverse ridges 18 and 19 is exactly equal to one film thickness.

The bolts 12 hold the gate elements 10 and 11 fixedly with respect to each other at the aforementioned spacing of the ridge summits and the film 21 is held preferably plane therebetween. The contact of the guiding surfaces with the film only at intervals results in a film gate presenting only slight frictional resistance to passage of the film through the gate and without sacrifice of planeness of the film at the gate aperture. However, the frictional resistance to the film in the gate may become so small that the inertia in the film will cause coasting thereof and inaccurate framing within the gate aperture. Therefore it may not be possible or desirable to use an ordinary claw-type pull-down to advance the film and an intermittent film advancing mechanism which continuously engages the film should be employed.

The pull-down may be of the well known Geneva type comprising a sprocket wheel 22 to engage the film perforations, a star wheel 23 coaxial and mounted to turn with said sprocket wheel 23, and a disk 24 having a cam 25 and pin 26. The intermittent film advancing mechanism continuously engaging the film such as the Geneva pull-down constitutes per se no part of the present invention, but has operating characteristics that make the combination thereof with the film gate of the invention particularly advantageous.

Another modification of the present invention, which is particularly applicable to printers or printing apparatus, is illustrated in Figs. 4, 5 and 6. In this modification the gate element 10 is provided with an aperture 29 located centrally therein and opposite the aperture 15 in gate element 11 when gate elements 10 and 11 are fixedly fastened together by bolts 12. Gate element 10 has integral therewith a pair of parallel runners 27 which have a spacing corresponding to the film width and which are recessed at intervals to form transverse ridges 28. The runners 27 are undercut adjacent aperture 29 as best shown in Fig. 4, while a presser pad 30 having a plurality of corrugations 31 is inserted through aperture 29. Presser pad 30 has shoulders 32 thereon adapted to abut the face of gate element 10 when the summits of corrugations 31 are in the same flat plane as the summits of ridges 28. Springs 33 are fastened to the face of gate element 10 and the free ends of said springs 33 bear on presser pad 30 to resiliently maintain the shoulders 32 in abutment with gate element 10. Presser pad 30 may be moved by sufficient pressure on the corrugations 31 to positions in which the summits thereof are in a plane in front of the flat plane of the summits of transverse ridges 28.

The gate element 11 in the modification of Figs. 4, 5, and 6, has parallel runners 34 which are recessed at intervals to form transverse ridges 35 preferably of the same frequency as ridges 18 and 19 near the end of said runners 34. The central portions of said runners 34 are recessed at intervals less than those between ridges 35 to form corrugations 36 of greater frequency but with the summits thereof in the same flat plane as the summits of ridges 35. Corrugations 36 are of a frequency equal to the frequency of corrugations 31 on presser pad 30 and occur on the respective elements so that the summits of said corrugations are in staggered relation.

Since this modification of the film gate is particularly adapted to printers and printing apparatus, two strips of film, a negative film 37 and a sensitive layer 38, pass between the gate elements 10 and 11. Because of the adaptation of this film gate to printers and since the slight serpentine film path therein is desirable, the spacing between the flat plane of the opposed and staggered ridges 28 and 35 is less than two film thicknesses. Spacers 39 are integral with one side of gate elements 10 and 11 and may be of a height which exceeds the height of ridges 28 and 35 by less than the thickness of one film, or of a height so that the total space between the flat planes of the ridge summits 28 and 35 will be more than one and less than two film thicknesses when the gate elements 10 and 11 are fastened together by bolts 12.

The summits of corrugations 36 are in the same flat plane as summits of ridges 35, and the minimum spacing between this plane and the movable plane of the summits of corrugations 31 is less than two film thicknesses. However, due to the resiliency of the pressure on presser pad 30, to move corrugations 31 into this position of minimum spacing, it is possible by the exertion of sufficient pressure against these springs to move presser pad 30 to other positions so that the spacing between the summits of corrugations 31 and 36 may be equal to or more than two film thicknesses. Thus splices in the film may readily pass through all portions of the gate without causing jamming or undue tension on the film.

The intervals between each of the ridges in the modifications of the film gate shown in Figs. 1, 2, and 3, are such that even with the spacing of only one film thickness between the planes of summits of opposed ridges, a splice may readily pass through the film gate without injuring the splice or affecting the operation of the photographic apparatus.

Also in the modification illustrated in Figs. 1, 2, and 3, the contact between the summits of the ridges 18 and 19 and the film, preferably approaches line contact. However, in the modification shown in Figs. 4, 5, and 6, the contact between the summits of ridges 28 and 35 and the film is a surface contact because of the serpentine form of the film on each side of the aperture, but line contact may be approached at the gate aperture upon movement of presser pad 30 against the action of springs 33.

The adaptation of the film gate of this invention to any type of motion picture apparatus is deemed to be within the knowledge of one skilled in the art and thus is within the scope of the invention. The invention in its broadest terms embraces a film gate having fixed undulating surfaces with the summits thereof in staggered relation and in flat planes spaced from one to less than two film thicknesses apart. The spacing between the summits of corrugations 31 and 36 is at least less than two film thicknesses, but presser pad 30 may be resiliently moved so that such spacing is equal to or more than two film thicknesses. This spacing of the flat planes is also in one direction only and neither flat plane may be spaced the stated distance from the other plane so as to pass through the ridges or corrugations, thus in the claims the spacing of the flat planes is stated in terms of the distance from the other plane of summits and the ridges thereof to indicate that the spacing may be in one direction only. The extreme accuracy with which the film is positioned between the gate members or with which the film is maintained in a flat plane is the result of the relatively short longitudinal spacing of the ridge summits on each runner. This feature is particularly employed in the modification of Figs. 4, 5, and 6, in which the frequency of the ridges is increased and the longitudinal spacing thereof on each gate element is decreased. The longitudinal spacing of the ridge summits or film engaging portions on the individual gate members should not exceed the width of the film, and is preferably less than the height of a picture area on the film or less than the height of apertures 14 and 15. Such longitudinal spacing of the film engaging portions results in at least three point support for the margin or each margin of the film which is opposite or framed by the gate aperture.

Having now particularly described my invention, what I desire to secure by Letters Patent of the United States and what I claim is:

1. A photographic gate for film comprising a pair of gate members arranged to maintain the film in a flat plane therebetween and having facing undulating surfaces with the summits thereof in staggered relation, said summits being longitudinally spaced along each gate member at a distance less than the film width and being in parallel flat planes which planes are each spaced from the opposite undulating surface and which planes are spaced at a distance of at least one film thickness from each other.

2. A photographic gate for film comprising a pair of gate members one of which may be provided with an aperture and both of which are arranged to maintain the film in a flat plane at said aperture, said gate members having facing undulating surfaces positioned with the summits thereof in staggered relation, said summits being longitudinally spaced along each gate member at a distance less than the least dimension of said aperture and being in parallel flat planes which planes are each spaced from the opposite undulating surface and which planes are spaced at a distance of at least one film thickness from each other.

3. A photographic gate for film comprising a pair of gate members one of which may be provided with an aperture and both of which are arranged to maintain the film in a flat plane at said aperture, said gate members having facing undulating surfaces positioned with the summits thereof in staggered relation, said summits being longitudinally spaced along each gate member at a distance less than the height of said aperture and being in parallel flat planes which planes are each spaced from the opposite undulating surface and which planes are spaced at a distance of at least one film thickness from each other.

4. A photographic gate for film comprising a pair of gate members, one of which is provided with an aperture, and having spaced film engaging portions for engaging the opposite sides of the film, said film engaging portions being staggered with respect to the film engaging portions on the opposite gate member, being so spaced longitudinally on respective gate members that at least three of said film engaging portions contact the margin of the film which is opposite said aperture, and being in parallel flat planes which are spaced at a distance of at least one film thickness from each other and which planes are each spaced from the film engaging portions on the opposite gate member.

5. In a photographic gate for film and combination with front and back elements and a pair of parallel runners on each element, arranged to guide the margins of the film and having a plurality of transverse ridges, said elements being rigidly fastened to each other with runners facing each other and with said ridges in staggered relation and spacing means between said elements to maintain one plane of ridge summits spaced from the ridges on the opposite runner and at a distance of at least one film thickness from the plane of ridge summits on the opposite runner, of a guide means at each end of the gate positioning the edges of the film intermediately of the runner.

6. A photographic gate for film comprising a pair of gate elements each having a pair of runners, a plurality of transverse ridges in said runners, and a plurality of transverse ridges extending from one runner to another on the same element, and spacing means for said gate elements to fixedly position the same with all ridge summits in staggered relation and with said summits in flat planes each spaced from the opposite ridges and spaced at a distance of at least one film thickness from each other.

7. A photographic gate for film comprising a pair of gate elements provided with a gate aperture, a pair of runners on each element and spaced to guide the margins of the film, a plurality of transverse ridges on said runners and transverse ridges between said runners adjacent the gate aperture, and spacing means for said gate elements to fixedly position the same with all ridge summits in staggered relation and with said summits in flat planes each spaced from the opposite ridges and spaced at a distance of at least one film thickness from each other.

8. A photographic gate for film comprising a pair of gate elements with opposed undulating surfaces and spacing means for said gate elements to fixedly position the same with the summits of said undulating surfaces in staggered relation and with said summits in flat planes each spaced from the opposite undulating surface and spaced at a distance less than two film thicknesses from each other.

9. A photographic gate for film comprising two pairs of runners each having a plurality of transverse ridges, the middle ridges of a runner being of greater frequency than the ridges at each end, each runner facing the other runner of the pair with the ridges thereof in staggered relation, and spacing means for said runners to position the same with the plane of ridge summits on one runner spaced from the ridges on the other runner of a pair and at a distance more than one and less than two film thicknesses from the plane of the ridge summits on said other runner of a pair.

10. A photographic gate for film comprising a pair of gate elements provided with gate apertures, a pair of runners on each gate element having a plurality of transverse ridges, each runner facing a runner on the opposite gate element with said ridges in staggered relation, spacing means for said gate elements to position the same with the summits of the ridges on one runner in a plane at a distance more than one and less than two film thicknesses from the plane of the ridge summits on the opposite runner, and a presser pad having transverse corrugations being spring pressed through one of said gate apertures to abut the gate element with the plane of the corrugation summits at a distance of more than one and less than two film thicknesses from the plane of the summits of the opposed ridges.

11. A photographic gate for film comprising a pair of gate elements provided with gate apertures, a pair of runners on each gate element having a plurality of transverse ridges, each runner facing a runner on the opposite gate element with said ridges in staggered relation, spacing means for said gate elements to position the same with the summits of the ridges on one runner being in a plane at a distance more than one and less than two film thicknesses from the plane of the ridge summits on the opposite runner, a presser pad having transverse corrugations and slidable within one of said gate apertures to abut the gate element with the plane of the corrugation summits at a distance of more than one and less than two film thicknesses from the plane of the summits of the opposed ridges and resilient means on said gate element resiliently holding said presser pad against said gate element.

12. A photographic gate for film comprising a pair of gate elements provided with gate apertures, a pair of runners on one gate element having a plurality of transverse ridges, a plurality of corrugations in said runners adjacent the gate aperture, a pair of runners on the other gate element having a plurality of transverse ridges equal in frequency to the end ridges of the first mentioned gate element and being undercut adjacent the gate aperture, each runner facing a runner on the opposite gate element in staggered spaced relation, and spacers on said gate elements to maintain the same with the summits of said ridges and corrugations in a plane spaced at a distance more than one and less than two film thicknesses from the plane of the summits on the ridges of the opposite runner, a presser member having corrugations in staggered relation to the corrugations of the first mentioned runner, and springs on the second mentioned gate element resiliently holding said presser pad to abut said second mentioned gate element with the plane of the summits of the corrugations at a distance more than one and less than two film thicknesses from the plane of the corrugation summits on the first mentioned gate element.

PERCY R. ORD.